United States Patent [19]

Arai et al.

[11] Patent Number: 4,688,852
[45] Date of Patent: Aug. 25, 1987

[54] VERTICAL ADJUSTMENT DEVICE FOR HEADREST IN VEHICLE SEAT

[75] Inventors: Yoshio Arai; Hideo Nagashima, both of Akishima, Japan

[73] Assignee: Tachi-S Co., Ltd., Tokyo, Japan

[21] Appl. No.: 882,145

[22] Filed: Jul. 3, 1986

[51] Int. Cl.$^4$ .............................................. A47C 7/36
[52] U.S. Cl. ..................................... 297/410; 297/355
[58] Field of Search ............... 297/410, 353; 312/348; 248/429, 188.9; 108/83, 143

[56] References Cited

U.S. PATENT DOCUMENTS

| | | | |
|---|---|---|---|
| 3,371,968 | 3/1968 | Loake | 312/348 X |
| 3,397,911 | 8/1968 | Brosius | 297/410 X |
| 3,476,435 | 11/1969 | Hitzelberger | 248/429 X |
| 3,658,398 | 4/1972 | Abbate et al. | 312/348 X |
| 3,796,169 | 3/1974 | Bales et al. | 248/188.9 X |
| 3,927,918 | 12/1975 | Dobbratz | 108/83 X |
| 4,437,715 | 3/1984 | Jenkins | 312/348 |

FOREIGN PATENT DOCUMENTS

| | | | |
|---|---|---|---|
| 3342460 | 6/1985 | Fed. Rep. of Germany | 297/410 |
| 6082455 | 5/1985 | Japan | 297/410 |

Primary Examiner—Francis K. Zugel
Attorney, Agent, or Firm—Oldham, Oldham & Weber Co.

[57] ABSTRACT

A vertical adjustment device for adjusting the height of a headrest for use in a vehicle seat is disclosed, which comprises two outer slides respectively erected above a seat back, two inner slides respectively provided on either sides of the headrest to be inserted into the respective outer slides in a vertically slidable manner, and two stoppers each provided in the lower end portion of each of the outer slides to prevent the inner slide from slipping off downwardly. Each of the stoppers is fitted into the lower portion of the outer slide and is formed of synthetic resin integrally with a protection cover in the lower portion thereof to cover up the lower edge of the outer slide. A shock absorbing member is provided over the upper opening of the outer slide.

4 Claims, 6 Drawing Figures

VERTICAL ADJUSTMENT DEVICE FOR HEADREST IN VEHICLE SEAT

BACKGROUND OF THE INVENTION

1. Field of the Invention

The present invention relates to a vertical adjustment device for adjusting the height of a headrest used in a vehicle seat, and, more particularly, to a headrest vertical adjustment device which is capable of adjusting the height of the headrest while supporting, from right and left, a headrest body to be mounted to an automotive seat.

2. Description of the Prior Art

In a conventional vehicle seat headrest vertical adjustment device of this type, an inner slide is vertically slidably mounted internally of right and left outer slides fixed to an arm projected upwardly from a seat back and spaced therefrom, and a stopper is attached through a screw to the lower ends of the outer slides to prevent the above-mentioned inner slide from slipping off downwardly.

However, in the conventional device, there are several problems to be solved. In other words, since the inner slide as well as the stopper secured by means of the screw are formed of metal, respectively, when the inner slide is brought into abutment with the stopper, a metallic shock sound is generated to hurt the feelings of an occupant of the seat. Also, since the outer slides are mounted to a location above the seat back by means of the above-mentioned arm, the screw or the like for the stopper is exposed from the lower portions of the outer slides, impairing the appearance of the headrest. Further, since the arm is welded substantially to the central portions of the outer slides in the vertical direction thereof and the upper ends and outer side surfaces of the arm and outer slides are covered with a flexible cover, when a hard thing happens to hit the cover on the upper ends of the outer slides, then the upper ends of the outer slides provide edges to break the cover, so that the outer slides are exposed and the exposed outer slides may give damage to the seat occupant.

SUMMARY OF THE INVENTION

The present invention aims at eliminating the drawbacks found in the above-mentioned conventional device.

Accordingly, it is an object of the invention to provide a headrest vertical adjustment device which is capable of preventing the generation of a shock sound due to the abutment of an inner slide with a stopper and also improving the appearance of the lower portions of outer slides.

In order to accomplish this object, according to the invention, the stopper is formed of synthetic resin and is inserted into and fixed to the lower portions of the outer slides, while the stopper is provided in the lower portion thereof with a protection cover which is formed integrally with the stopper for covering up the lower edges of the outer slides.

In other words, because the stopper is a synthetic resin member, it is capable of absorbing shocks given due to the impingement by the inner slide to prevent the generation of the shock sound. Also, since the protection cover is formed integrally with the stopper, when the stopper is mounted to the lower ends of the outer slides, the protection cover is able to cover the lower portions of the outer slides so as to enhance the appearance thereof.

It is another object of the invention to provide a safe headrest for a vehicle seat in which a cover placed over the upper portions of the outer slides will never be broken even when a hard thing happens to hit against the cover or when a shock is given to the cover.

In attaining this object, according to the invention, there is provided a shock absorbing member between the upper end portion of the outer slide, into which the inner slide supporting a vertically movable headrest body is fitted, and the cover for covering the outer slide. Thus, the shock absorbing member placed on the upper end portion of the outer slide serves to relieve and absorb shocks given from the cover on the upper portion of the outer slide, so that there is no possibility of the cover being damaged or broken.

The above and other related objects and features of the invention will be apparent from a reading of the following description of the disclosure found in the accompanying drawings and the novelty thereof pointed out in the appended claims.

BRIEF DESCRIPTION OF THE DRAWINS

DETAILED DESCRIPTION OF PREFERRED EMBODIMENTS OF THE INVENTION

Figure 1:
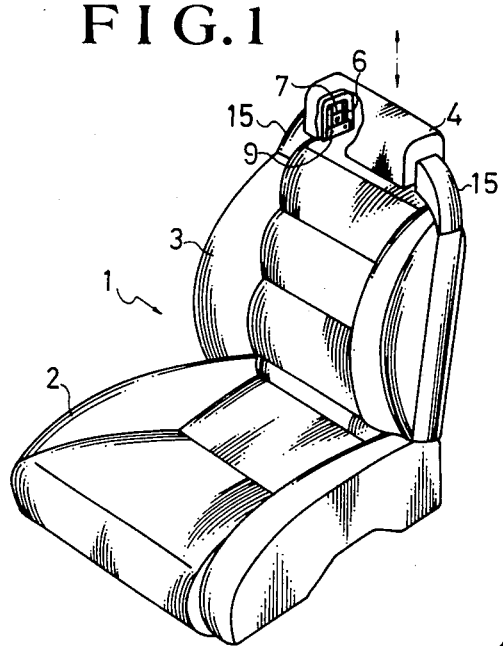
FIG. 1 is a perspective view of a seat having a headrest provided with a headrest vertical adjustment device in accordance with the present invention.
Figure 2:
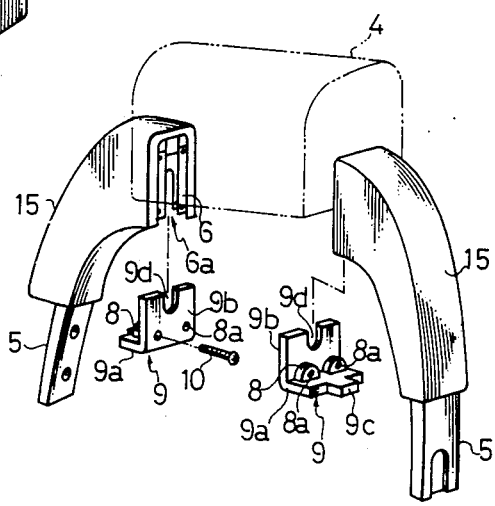
FIG. 2 is a perspective view of the headrest vertical adjustment device of the invention, illustrating how to mount a protection cover.

In FIGS. 1 and 2, a seat, which is designated by (1), comprises a seat cushion (2) and a seat back (3). (4) designates a headrest, and (5) represents arms each extending upwardly and inwardly of each side of the seat back (3). (6) denotes an outer slide having a substantially C-shaped section and located on the top end of the arm (5). Inner slides (7), each mounted to each side of the headrest (4), are vertically slidably mounted to the outer slides (6), respectively. In this structure, the outer slide (6) is open in the lower end thereof and thus can be viewed from outside. Thus, a stopper (8) with a protection cover to be discussed later is inserted into the opening in the outer slide (6) so as to prevent the inner slide (7) from slipping off from the opening in the outer slide (6).

The top or upper ends of the arms (5), (5) are fixed by welding to the outer side surfaces of the right and left outer slides (6), (6) in the substantially central portions and in the vertical direction thereof, while the lower ends of the arms (5) are fixed to a seat frame of the seat back (3) by screws or welding, respectively. The whole arm (5) and the outer slide (6) except for the inside side surface thereof are covered with a cover (15) which is formed of foam material (e.g., urethane foam).

The inner slide (7) is formed of a flat metal plate, into which is inserted a stay (12) to be connected to a frame (not shown) within a headrest (4). The stay (12) has a leading end (12a) which is engageable with one of engagement portions (6d), (6d),—formed in the wall of the outer slide (6) so as to be able to hold the head-rest (4) in a predetermined height.

The outer slide (6) is formed with a guide groove (6c) into which the leading end (12a) of the stay (12) can be inserted. This notched guide groove (6c) extends longitudinally of the outer slide (6) and is formed with the engagement portions (6d), (6d), (6d). The guide groove (6c) is narrower than the diameter of stay (12), while each engagement portion (6d) has an inside diameter substantially equal to the diameter of the stay (12). The guide groove (6c) is elastic in its width direction and thus the width thereof can be increased by a predetermined force or more.

The following is the structure of the stopper (8) integrally formed with the protection cover (9) to prevent the inner slide (7) from slipping off downwardly.

That is, the stopper (8) is inserted into the outer slide (6) through an opening (6a) formed in the lower portion of the outer slide (6), and is then fixed to the outer slide (6) by tightening a screw (10) through a threaded bore (8a) formed in the stopper (8).

The protection cover (9) formed integrally with the stopper (8) comprises a horizontal section (9a) and a vertical section (9b). In the above-mentioned state where the stopper (8) is inserted into and fixed to the outer slide (6), the horizontal section (9a) of the cover (9) covers the opening (6a) of the outer slide (6) and the vertical section (9b) covers the outer surface of the lower portion of the outer slide (6) so as to provide a fine appearance.

Also, in this state, a projection (9c) formed in the leading end of the horizontal portion (9a) of the protective cover (9) is brought into engagement with a recess (5a) formed in the arm (5), thereby assuring a further stabler mounting of the cover (9) to the outer slide (6).

Figure 3:
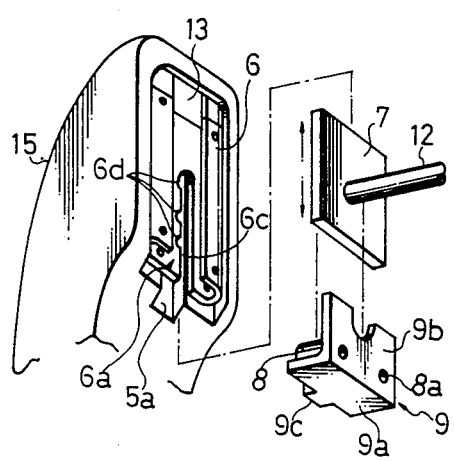
FIG. 3 is an expanded perspective view of FIG. 2.
Figure 4:
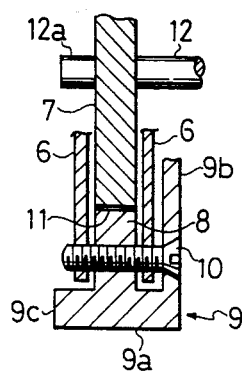
FIG. 4 is a section view of the present adjustment device, illustrating the portion thereof to which the protection cover is mounted.

The protective cover (9) is also formed with a cutaway portion (9d) in the vertical section (9b) thereof. This cutaway portion (9d) serves as guide means which allows the stay (12) of the inner slide (7) to move upwardly or downwardly, so that the inner slide (7) can reach the stopper (8) smoothly, (FIGS. 2, 3 and 4).

According to the above-mentioned embodiment of the invention, the stopper is formed of synthetic resin and the inner slide is prevented against its downward removal, whereby, during the downward movement of the inner slide, a shock sound or a strange sound can be absorbed to thereby eliminate an unpleasant feeling due to the strange sound.

Also, since the lower portions of the inner and outer slides are covered with the protection cover, the appearance of the headrest can be enhanced.

Figure 5:
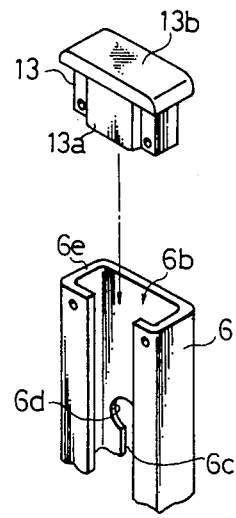
FIG. 5 is a perspective view to illustrate how to mount a shock absorbing member to an outer slide; and, FIG. 6 is a section view to illustrate a state in which the shock absorbing member has been mounted.
Figure 6:
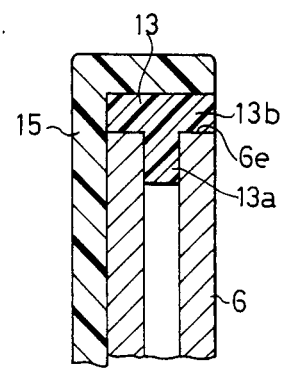

Referring now to FIGS. 5 and 6, there is illustrated another embodiment of the invention, in which a shock absorbing member (13) is mounted to the opening (6b) formed in the upper end of the outer slide (6) so as to prevent a cover (15) from being damaged or broken. Into the upper end opening (6b) of the outer slide (6) is inserted a shock absorbing member (13) of synthetic resin which covers the edge portion (6e) of the outer slide (6).

The shock absorbing member (13) comprises an insertion portion 13a to be inserted into the outer slide (6) and a cover portion (13b) for covering the edge (6e) of the outer slide (6), and is also mounted to the outer slide (6) in a fixed manner. Namely, the shock absorbing member (13) covers the edge portion (6e) of the outer slide (6) to prevent the edge portion (6e) from coming into contact with the cover (15).

According to the above-mentioned embodiment of the invention, in the upper end opening (6b) of the outer slide (6) in the arm (5) supporting the headrest (4), there is provided the shock absorbing member (13) of synthetic resin, and the edge portion (6e) of the outer slide (6) is covered with the shock absorbing member (13) to prevent the edge portion (6e) from coming into contact with the cover (15), whereby the cover (15) will never be damaged or broken by the edge portion (6e) of the outer slide (6) even when a hard thing hits against the cover (15) on the outer slide (6) or a shock force is applied thereto, and thus the outer slide (6) can be positively covered with the cover (15) to provide a safe headrest.

Although in the above-mentioned embodiment the shock absorbing member (13) is formed of synthetic resin, this is not limitative, but it may be formed of any material which has a shock absorbing function. Also, in the foregoing description, the shock absorbing member (13) is composed of the insertion portion (13a) for insertion into the guide groove (6c) of the outer slide (6) and the cover portion (13b) for covering the edge portion of the outer slide (6), but the shock absorbing member (13) may be constructed so as to be able to cover at least the edge portion (6e) of the outer slide (6). The shock absorbing member (13) may also take various shapes other than the illustrated one.

As has been described hereinbefore, according to the invention, there is provided a shock absorbing member between an upper end portion of an outer slide supporting a headrest for a vehicle seat and a cover for covering the outer slide to prevent the cover from coming into contact with the upper end portion of the outer slide, whereby a shock force given to the cover can be absorbed by the shock absorbing member to protect the cover against damage or breakage, so that a safe headrest for a vehicle seat can be obtained.

What is claimed is:

1. A vertical adjustment device for a headrest for use in a vehicle seat, said device comprising:
   two outer slides respectively fixed to the interiors of two arms respectively projected upwardly from a seat back and spaced therefrom; and,
   two inner slides respectively provided on either side surfaces of said headrest to be vertically slidably inserted into said outer slides, characterized in that, in the lower end portion of each of said outer slides, there is provided a stopper of synthetic resin to prevent said inner slide from slipping off downwardly, and that said stopper can be inserted into the lower portion of said outer slide and is provided in the lower portion thereof with a protection cover formed from synthetic resin, said protection cover being formed integrally with said stopper and comprising a horizontal portion to cover the lower opening of said outer slide, a vertical portion to cover the lower outer surface of said outer slide, a projected portion formed integrally with said horizontal portion for engagement with a recessed portion formed in said arm, and a cutaway portion formed in said vertical portion to allow a stay secured to said inner slide to be engaged therewith when the lower end of said inner slide is brought into contact with said stopper.

2. A vertical adjustment device for a headrest as set forth in claim 1 wherein the upper end portion of each of said outer slides is closed by each of said arms, and there is provided a shock absorbing member in the portion of said outer slide with which the upper end of said inner slide is brought into contact.

3. A vertical adjustment device as set forth in claim 1, wherein said outer slide is formed of metal in a substantially C-shaped configuration, and in which a stay projecting from each side of said headrest is fixedly secured to said inner slide formed of metal and adapted to be vertically slidably inserted into said metal outer slide, said stay extending into said inner slide and being engaged with said outer slide through the engagement portion thereof, said outer slide having an elastic guide groove containing notched engagement portions diposed therein, wherein said guide groove is narrower than the diameter of said stay, while said engagement portions have an inside diameter substantially equal to the diameter of said stay.

4. A vertical adjustment device as set forth in claim 1, wherein said stopper is composed of two semi-circular plates and is formed integrally with said horizontal portion of said protection cover, each of said semi-circular plates being fixed to said outer slide by one or more screws.

* * * * *